United States Patent
Ohara

(10) Patent No.: US 8,127,811 B2
(45) Date of Patent: Mar. 6, 2012

(54) SIPE BLADE AND TIRE MOLDED USING THE SAME

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 884 days.

(21) Appl. No.: 12/102,377

(22) Filed: Apr. 14, 2008

(65) Prior Publication Data

US 2008/0251175 A1 Oct. 16, 2008

(30) Foreign Application Priority Data

Apr. 16, 2007 (JP) ................................ 2007-107246

(51) Int. Cl.
B29C 33/42 (2006.01)
B60C 11/12 (2006.01)

(52) U.S. Cl. ........ 152/209.18; 152/209.21; 152/DIG. 3; 425/28.1

(58) Field of Classification Search ............. 152/209.18, 152/209.21, DIG. 3; 425/28.1
See application file for complete search history.

(56) References Cited

U.S. PATENT DOCUMENTS

| | | | | |
|---|---|---|---|---|
| 2,736,924 | A * | 3/1956 | Bean ........................... | 425/28.1 |
| 4,723,584 | A * | 2/1988 | Yamaguchi et al. ..... | 152/DIG. 3 |
| 6,196,288 | B1 * | 3/2001 | Radulescu et al. ........ | 152/DIG. 3 |
| 6,264,453 | B1 * | 7/2001 | Jacobs et al. ................. | 425/28.1 |
| 2005/0150582 | A1 * | 7/2005 | Matsumura ............. | 152/209.18 |

FOREIGN PATENT DOCUMENTS

| | | | |
|---|---|---|---|
| JP | 60-128005 | * | 7/1985 |
| JP | 62-241712 | * | 10/1987 |
| JP | 10-058458 | | 3/1998 |
| JP | 2757051 | * | 3/1998 |
| JP | 2890310 | | 2/1999 |
| JP | 2000-102925 | | 4/2000 |

OTHER PUBLICATIONS

Machine translation for Japan 2757051 (no date).*
Translation for Japan 62-241712 (no date).*

* cited by examiner

Primary Examiner — Steven D Maki
(74) Attorney, Agent, or Firm — Fish & Richardson P.C.

(57) ABSTRACT

A sipe blade for forming a sipe with one end opened and the other end closed in a land portion on a tread surface of a tire includes a front-end portion that forms the closed end of the sipe and a connection-end portion that forms the open end of the sipe being connected to a rib that forms a groove. A first thickness of the front-end portion is larger than a second thickness of a thinnest portion. A third thickness of the connection-end portion is 3 mm or less and is the largest thickness in a portion between the front-end portion and the connection-end portion, and the ratio of the third thickness with respect to the second thickness; i.e., the third thickness/the second thickness is 1.2 to 3.0.

2 Claims, 4 Drawing Sheets

PRIOR ART

SIPE BLADE AND TIRE MOLDED USING THE SAME

BACKGROUND OF THE INVENTION

1. Field of the Invention

The present invention relates to a sipe blade for forming a sipe with one end opened and the other end closed in a land portion on a tread surface of a tire, and to a tire molded using the sipe blade.

2. Description of the Related Art

Conventionally, a heavy load pneumatic tire is formed with a plurality of cuts called sipes in a land portion such as a block or rib formed in a tread surface of the tire in order to increase the braking performance and driving performance as well as to reduce irregular wear of the tire. Particularly, the following sipes are effective for reducing the stiffness of the land portion; i.e., both-side-open sipe with open ends at both side walls of a land portion; and one-side-open sipe with one end opened and the other end closed. In the both-side-open sipe, since a land portion is divided into a plurality of small blocks, the stiffness of the land portion may be reduced too much. As a result, heel and toe wear may be generated thereon. In such a case, the one-side-open sipe is employed.

The sipes are formed using sipe blades of a thin plate (hereinafter referred to as a blade) attached to a tire vulcanizing mold (refer to Japanese Unexamined Patent Publication (Kokai) No. 2000-102925, and Japanese Unexamined Patent Publication (Kokai) No. 10-58458). In a blade for forming the one-side-open sipe, the one end thereof is connected to a rib for forming a groove portion, while the other end is in an unsupported state. Therefore, there may occur such a problem that when a bending stress acts on the blade while removing the tire from the mold after the vulcanizing processing, a portion of the blade connected to the rib may function as a fulcrum of a bending deformation, and stress may converge to the connection portion causing a bending, breakage or damage.

Japanese Patent No. 2,890,310 discloses a pneumatic tire formed with one-side-open sipes in which, in order to prevent the stress convergence at a closed end, the thickness of the sipe gradually decreases from the closed end toward the open end so that the thickness of the closed end is larger than the thickness of the open end. However, in the case of such a tire, the thickness of the blade for forming the sipe is thin at the portion connected to the rib, while thick at the front-end portion. Therefore, a large stress converges at the connection portion, and the blade tends to be bent or broken. Moreover, there is a problem that the land portion tends to form a sharp angle near the open end of the sipe causing irregular wear such as river wear on the tread surface.

SUMMARY OF THE INVENTION

The present invention has been proposed in view of the above circumstances. It is an object of the present invention to provide a sipe blade free from bending and/or breakage while vulcanizing processing of a tire and capable of preventing irregular wear such as river wear from being generated on the tire due to the formed sipe, and to provide a tire molded using the sipe blade.

The above objects can be achieved by the present invention described below. That is, a sipe blade according to the present invention is a sipe blade for forming a sipe with one end opened and the other end closed in a land portion on a tread surface of a tire, which includes: a front-end portion that forms the closed end of the sipe; and a connection-end portion that forms the open end of the sipe being connected to a rib that forms a groove portion, wherein the thickness of the front-end portion is larger than the smallest thickness in a portion between the front-end portion and the connection-end portion, the thickness of the connection-end portion is 3 mm or less and is the largest thickness in the portion between the front-end portion and the connection-end portion, and the ratio of the largest thickness with respect to the smallest thickness is 1.2 to 3.0.

In the sipe blade according to the present invention, the thickness of the front-end portion is larger than the smallest thickness in the portion between the front-end portion and the connection-end portion, and the thickness of the connection-end portion is the largest in the portion between the front-end portion and the connection-end portion. Therefore, the portion having the smallest thickness resides in neither the front-end portion nor the connection-end portion. The strength of the connection-end portion, where the stress tends to converge when the tire is removed from the mold after the vulcanizing processing, is increased. Accordingly, the blade is appropriately prevented from being bent or broken. Also, the connection-end portion has the largest thickness. With this arrangement, the land portion is prevented from forming a sharp angle near the open end of the formed sipe, thereby generation of the river wear is effectively prevented.

In the sipe blade according to the present invention, the thinnest portion having the smallest thickness is preferably continuous to the connection-end portion being interposed by a rounded surface having an arc-like shape. With this arrangement, the stress convergence on the connection-end portion is effectively suppressed, and thus the blade can be effectively prevented from being bent or broken.

A tire according to the present invention includes: a sipe with one end opened and the other end closed formed in a land portion of a tread surface thereof, wherein the width at the closed end of the sipe is larger than the smallest width in a portion between the closed end and the open end, the width at the open end of the sipe is 3 mm or less and is the largest width in the portion between the closed end and the open end, the ratio of the largest width with respect to the smallest width is 1.2 to 3.0.

In the tire according to the present invention, the width at the closed end of the sipe is larger than the smallest width in the portion between the closed end and the open end. Therefore, the stress convergence at the closed end is suppressed and crack resistance can be increased. Further, the width at the open end of the sipe is the largest in the portion between the closed end and the open end. Therefore, the land portion is prevented from forming a sharp angle near the open end, and thus irregular wear such as river wear is prevented. Also, since the configuration of the sipe blade for forming the sipe is as described above, the blade is prevented from being bent or broken while performing the vulcanizing processing.

In the tire according to the present invention, the narrowest portion having the smallest width is preferably continuous to the open end being interposed by a rounded surface having an arc-like shape. With this arrangement, crack (plucked-out) in the land portion near the open end causing the river wear is effectively prevented, and thus irregular wear is appropriately prevented.

DETAILED DESCRIPTION OF THE PREFERRED EMBODIMENTS

Figure 1:
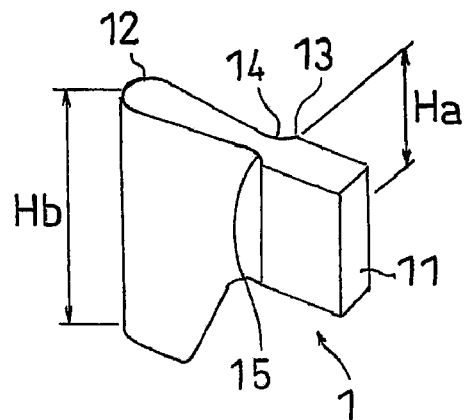
FIG. 1 is a perspective view illustrating an example of a sipe blade according to the present invention.
Figure 2:
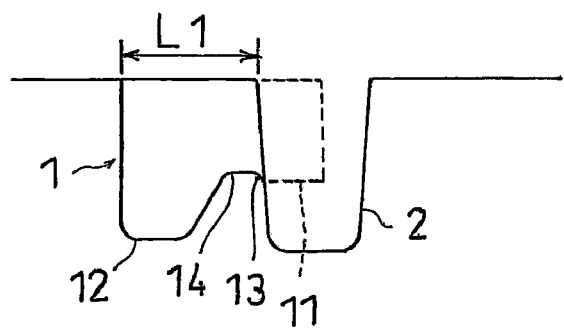
FIG. 2 is a side view when the sipe blade is attached to a vulcanizing mold.
Figure 3:
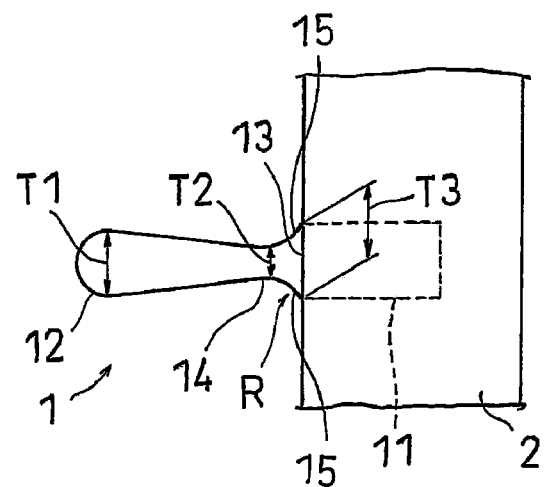
FIG. 3 illustrates the sipe blade in FIG. 2 as is viewed from the bottom side thereof.

Embodiments of the present invention will be described below with reference to the drawings. FIG. 1 is a perspective view illustrating an example of a sipe blade according to the present invention. FIG. 2 is a side view of the sipe blade disposed on a vulcanizing mold. FIG. 3 illustrates the sipe blade viewed from the bottom side thereof in FIG. 2.

The sipe blade 1 (hereinafter referred to as a blade 1) is a thin plate member for forming a one-side-open sipe in a land portion formed in a tread surface of a tire. As illustrated in FIG. 2 and FIG. 3, a grip portion 11 is embedded in a rib 2 for forming a groove portion to be held thereby. Thus, the sipe blade 1 is disposed on the vulcanizing mold in a cantilevered state. The blade 1 has the grip portion 11, a front-end portion 12 that forms a closed end of the sipe, and a connection-end portion 13 that is connected to the rib 2 and forms an open end of the sipe.

Thickness of the blade 1 is not constant in a longitudinal direction. The blade 1 has a configuration that narrows at a thinnest portion 14, the thickness of which is the smallest in a portion between the front-end portion 12 and the connection-end portion 13. Thickness of the blade 1 gradually decreases from the front-end portion 12 toward the thinnest portion 14, which is located adjacent to the rib 2, and the thickness increases gradually from the thinnest portion 14 toward the connection-end portion 13. According to the present embodiment, the grip portion 11 is formed with a thickness identical to that of the connection-end portion 13. The front-end portion 12 is formed in a circular surface having an arc-like shape in end plane. The thickness T1 of the front-end portion 12 is set to be larger than the thickness T2 of the thinnest portion 14. With this arrangement, the curvature radius is ensured satisfactorily for the front-end portion 12, and the closed end of the formed sipe is prevented from being subjected to a stress conversion; thereby the crack resistance increased.

Thickness T3 of the connection-end portion 13 is set to be 3 mm or less and to be the thickest portion in the portion between the front-end portion 12 and the connection-end portion 13. Therefore, the blade 1 has the largest thickness at the connection-end portion 13 in a portion exposed from the rib 2. With this arrangement, the portion that has the smallest thickness resides in neither of the front-end portion 12 nor the connection-end portion 13. Accordingly, the strength of the connection-end portion 13, where the stress tends to converge while removing the tire from the mold after vulcanizing process, is increased. Thus, the blade 1 can be appropriately prevented from being bent or broken. The thickness T3 of the connection-end portion 13 may be identical to the thickness T1 of the front-end portion 12, and the relationship with the thickness of the grip portion 11 is not particularly restricted.

The thickness T3 of the connection-end portion 13 with respect to the thickness T2 of the thinnest portion 14 is set so that the ratio T3/T2 is 1.2 to 3.0. When the ratio T3/T2 is less than 1.2, the thickness T1 of the front-end portion 12, which is set to be identical to the thickness T3 or thinner than that, becomes too small. In that case, the improvement effect of the crack resistance cannot be appropriately obtained. If the ratio T3/T2 exceeds 3.0, the difference of the thickness in the blade 1 becomes too large. As a result, the formed sipe tends to be deformed at a point corresponding to the thinnest portion 14 (the narrowest portion 24, which will be described later) causing an irregular wear. Further, when a thickness T2 is adopted while taking the deformation of the sipe into consideration, and when a plurality of sipes are densely disposed in parallel to each other in a width direction of the sipe (thickness direction of the blade 1), the thickness of the grip portion 11 is hardly ensured satisfactorily, the holding force acting on the blade 1 is reduced and the mold may be broken.

According to the present embodiment, blade height Ha of the connection-end portion 13 is set to be smaller than blade maximum height Hb in a portion exposed from rib 2; for example, Ha=0.7 Hb. The reason of this is as described below. That is, the stiffness around the closed end is higher than that around the open end in a land portion formed with the one-side-open sipe. Therefore, in order to prevent the irregular wear, the sipe depth around the open end is arranged to be relatively shallow so as to increase the stiffness of the land portion. Also, according to the present embodiment, the blade maximum height Hb is set to be larger than a blade length L1 that corresponds to the sipe length (refer to FIG. 2).

As for the dimensions of the respective portions of the blade 1, the following are exemplified. That is, a length from the rib 2 to the front-end portion 12 is 4 to 6 mm; a length from the rib 2 to the thinnest portion 14 is 0.1 to 0.5 mm; and the blade height Ha of the connection-end portion 13 is 10 mm. According to the present embodiment, a side face at the base side of the blade 1 is formed in a rounded surface 15 having an arc-like shape as illustrated in FIG. 3, and the narrowest portion is the thinnest portion 14. The length from the rib 2 to the thinnest portion 14 is equivalent to the curvature radius of the rounded surface 15. As for the thickness of the blade 1 and the curvature radius R of the rounded surface 15, examples 1 to 3 are given in Table 1. The values in Table 1 are all expressed in mm.

TABLE 1

|  | Example 1 | Example 2 | Example 3 |
|---|---|---|---|
| T1 | 1.5 | 0.7 | 1.2 |
| T2 | 0.5 | 0.5 | 0.5 |
| T3 | 1.5 | 0.7 | 1.2 |
| T3/T2 | 3.0 | 1.4 | 2.4 |
| R | 0.5 | 0.1 | 0.3 |

As described above, according to the present embodiment, the thinnest portion 14 having the smallest thickness is continuous to the connection-end portion 13 being interposed by the rounded surface 15. This arrangement effectively relieves the connection-end portion 13 from convergence of stress, and accordingly the blade 1 is effectively prevented from being bent or broken. To appropriately obtain the above operation and effect, the curvature radius R of the rounded surface 15 is preferably ½ or less of the thickness T3 of the connection-end portion 13. Also, it is preferred that the rounded surface 15 continues smoothly to the surface of the blade that forms the wall surface of the sipe.

Constituent materials for the blade 1 and the mold to which the blade 1 is attached are not particularly restricted. However, it is preferred that the blade 1 is formed of an iron material, and the mold is formed of an aluminum alloy. In this case, the blade 1 and the mold are not being fused together; but both are held merely in a contact with each other. Here, the holding force acting on the blade 1 depends on the mechanical characteristics of the aluminum alloy. Therefore, when resistance acts on the front end of the blade 1 and stress converges on the boundary face of the blade 1 embedded in the mold while the tire is removed from the mold, it may cause a problem that the mold be sheared and broken at the boundary face (ridge line) resulting in a falling off of the blade 1. When the distance between the blades is relatively large (for example, 10 to 15 mm), such a problem hardly appears. But, when the sipes are disposed densely by disposing the blades at small intervals, the problem may become fatal.

When a plurality of blades 1 is disposed parallely in a thickness direction thereof, in view of ensuring the holding performance on the blade 1, the distance between the abutting blades 1 is preferably set to 2 mm or more; or more preferably to 5 mm or more. The thickness T3 of the connection-end portion 13 and the thickness T1 of the front-end portion 12 are arranged to be identical to each other. With this arrangement, the density of the disposed blades 1 is increased while ensuring the distance between the blades; and thus the sipe density is appropriately increased.

Figure 4:
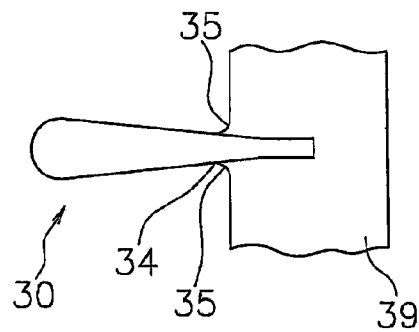
FIG. 4 is a cross sectional view of reference example of the sipe blade.

It is preferred that the blade 1 is integrally formed including the grip portion 11, the front end portion 12, the connection-end portion 13, the thinnest portion 14 and the rounded surface 15 as illustrated in FIGS. 1 to 3. With this arrangement, the rib 2 or the like is appropriately prevented from being peeled off. Contrarily, in the case where a thinnest portion 34 and a rounded surface 35 are formed by a rib 39 as illustrated in FIG. 4, a thin area extends in the rib 39. Therefore, there is a problem that the holding force acting on the blade 30 is reduced. That is, the blade 30 and the rib 39 are merely in a contact with each other. Therefore, when the blade 30 is deformed due to the resistance while removing the tire from the mold, the thin area of the rib 39 is peeled off and thus, the holding force acting on the blade 30 is reduced.

The blade 1 may be manufactured by employing a conventionally well-known method. However, according to the present invention, it is preferred that the blade 1 be manufactured utilizing a plate material having a uniform thickness by means of mold forging. In this case, compared to the front-end portion 12 and the connection-end portion 13, the density of the thinnest portion 14 is increased. As a result, the blade 1 superior in durability is obtained. Accordingly, the thinnest portion 14 appropriately withstands against the bending stress acting thereon when the tire is removed from the mold after the vulcanizing process. The following technique also may be employed. That is, the blade is formed integrally with the rib 2 by means of casting, and then is machined to form a blade that has the above-described configuration. In this case, according to the present embodiment, the thickness is gradually reduced from the connection-end portion 13 toward the thinnest portion 14. Therefore, there is no necessity to additionally form a machining run off for cutware like an end mill. Accordingly, the manufacturing efficiency of the mold is increased.

Figure 5:
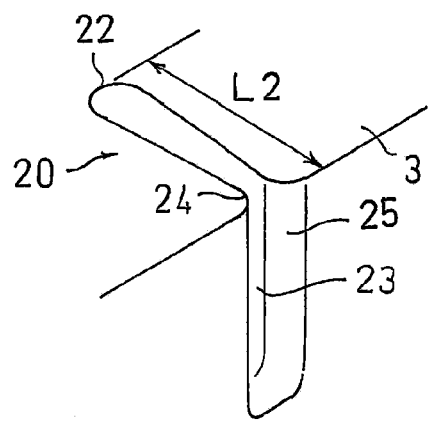
FIG. 5 is a perspective view illustrating a formed sipe.
Figure 6:
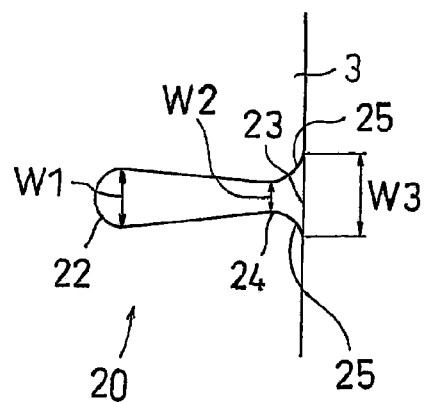
FIG. 6 is a plane view of the formed sipe.

During vulcanizing processing, the rib 2 is pressed onto the tread surface of the tire; and thus a groove portion corresponding to the rib 2 is formed. Thus, land portions such as a block and rib partitioned by the groove portions are formed. A sipe 20 is formed corresponding to the blade 1 in a land portion 3 as illustrated in FIG. 5 and FIG. 6. The sipe 20 is a one-side-open sipe in which one end is opened and the other end is closed. The sipe 20 has a closed end 22 formed by the front-end portion 12 of the blade 1 and an open end 23 formed by the connection-end portion 13. Although not illustrated in the figures, according to the present embodiment, a plurality of sipes 20 are disposed parallely in a width direction (in a vertical direction in FIG. 6) with a distance of approximately 4 to 6 mm between the centerlines of the sipes.

The sipe 20 has a configuration corresponding to a configuration of the blade 1 above described. That is, the width of the sipe 20 is not constant along the longitudinal direction. The sipe 20 has a configuration such that the width thereof is narrowed at the narrowest portion 24 having the smallest width. The width W1 of the closed end 22 is larger than the width W2 of the narrowest portion 24. The width W3 of the open end 23 is 3 mm or less and is the largest width of the sipe 20. Further, the ratio of width W3 with respect to the width W2 of the narrowest portion 24; W3/W2 is within a range of 1.2 to 3.0. Therefore, the crack resistance in the closed end 22 is increased as described above. The difference in a thick portion and a thin portion in a land portion between the sipes 20 is reduced; thereby generation of irregular wear is prevented. Moreover, the width W3 of the open end 23 is the largest. Therefore, the land portion 3 near the open end 23 is prevented from forming a sharp angle; thereby generation of the river wear is prevented.

Figure 7:
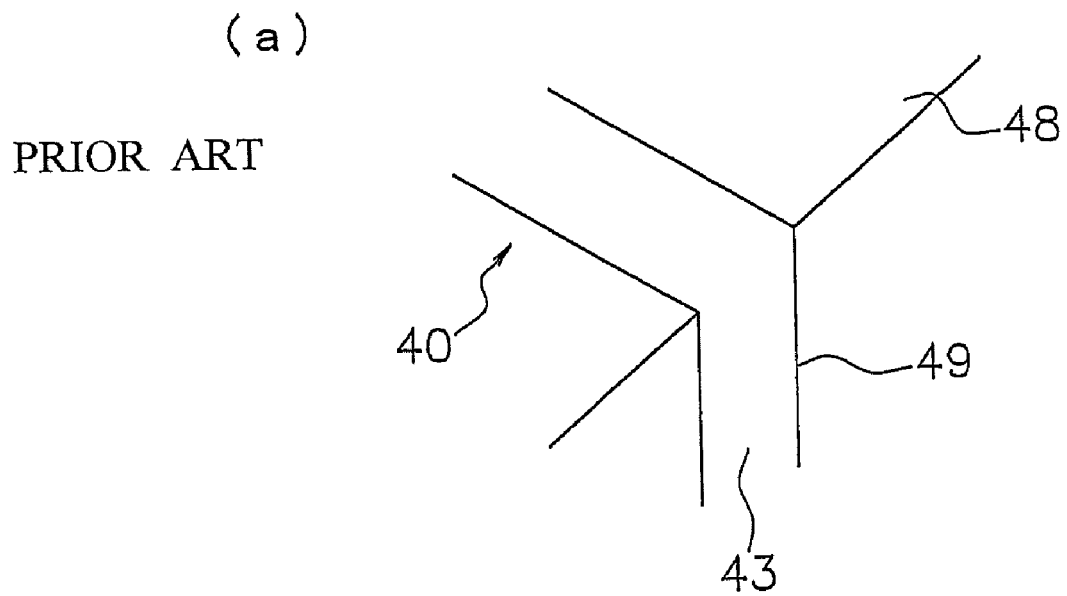
FIGS. 7(a) and 7(b) are enlarged views of an essential portion in a conventional sipe.
Figure 7:
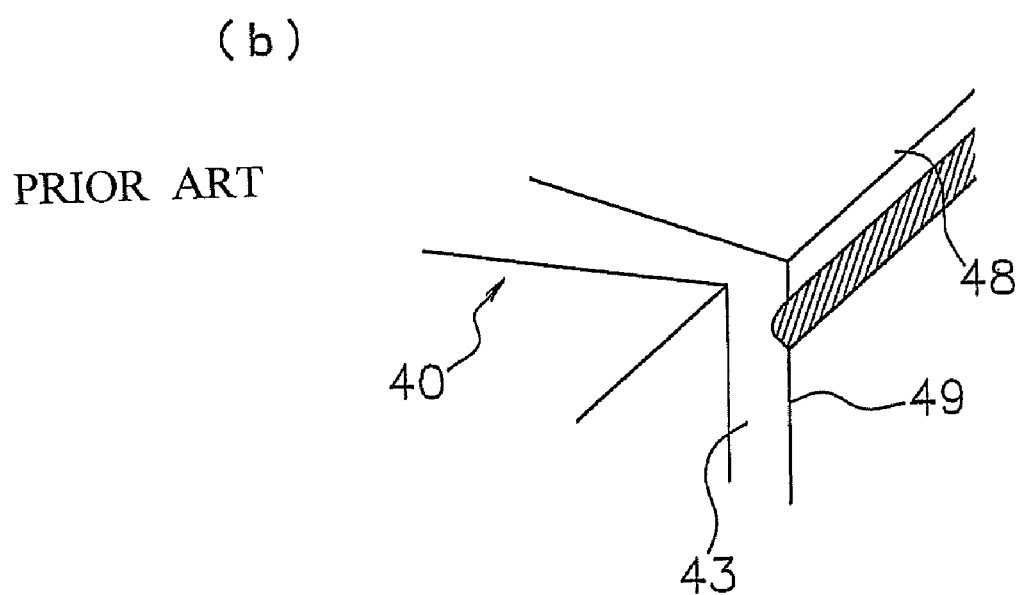

Contrarily, as a sipe 40 illustrated in FIG. 7, in the case where an edge portion of a land portion 48 is formed at right angles or in a sharp angle without forming rounded surface in an open end 43, when the wall surface of the land portion 48 is deformed and a gap is generated at a contact with the ground as illustrated in FIG. 7(b), an protruding edge portion 49 (right side in FIGS. 7(a) and 7(b)) tends to be entangled. As a result, for example, in a hatching area in FIG. 7(b), a crack (plucked-out) may be generated. At a stage when the tread surface becomes close to the crack in the process of wear, the edge portion 49 becomes like a cliff edge. As a result, ground-contact pressure tends to be released causing a slip wear. At a stage when the wear further proceed and the crack is exposed to the tread surface, the wear progresses locally in the edge portion 49 due to insufficient rubber volume resulting in a generation of river wear.

Contrarily, according to the present embodiment, the narrowest portion 24 having the smallest width is continuous to the open end 23 being interposed by the rounded surface 25 having an arc-like shape. In such arrangement, since the edge portion of the land portion 3 does not form a sharp angle and can be appropriately released for input from the road surface, the land portion 3 adjacent to the open end 23 can be effectively prevented from being cracked, and thus the generation of irregular wear can be prevented more effectively. In order to effectively prevent the entanglement of the edge of the land portion while ensuring the volume of the rubber around the open end 23, the curvature radius of the rounded surface 25 is preferably set to 0.1 to 0.5 mm; or more preferably to 0.2 to 0.3 mm. Also, in order to appropriately obtain the above operation and effect of the rounded surface 25, the curvature radius of the rounded surface 25 is preferably ½ or less of the width W3 of the open end 23.

According to the present embodiment, the blade maximum height Hb is arranged to be larger than the blade length L1. Accordingly, the depth at the closed end 22 of the sipe 20 is larger than the sipe length L2. With this arrangement, the sipe length L2 is arranged to be relatively short. Consequently, the land portion 3 can be prevented from cracking due to the cut of the sipe 20 while preventing the generation of irregular wear.

The tire according to the present invention is the same as ordinary pneumatic tires excepting a point that the above-described sipes are formed in the land portion of the tread surface. Any of conventional well-known materials, configurations, structures, manufacturing methods and the like is applicable to the present invention.

EXAMPLES

Figure 8:
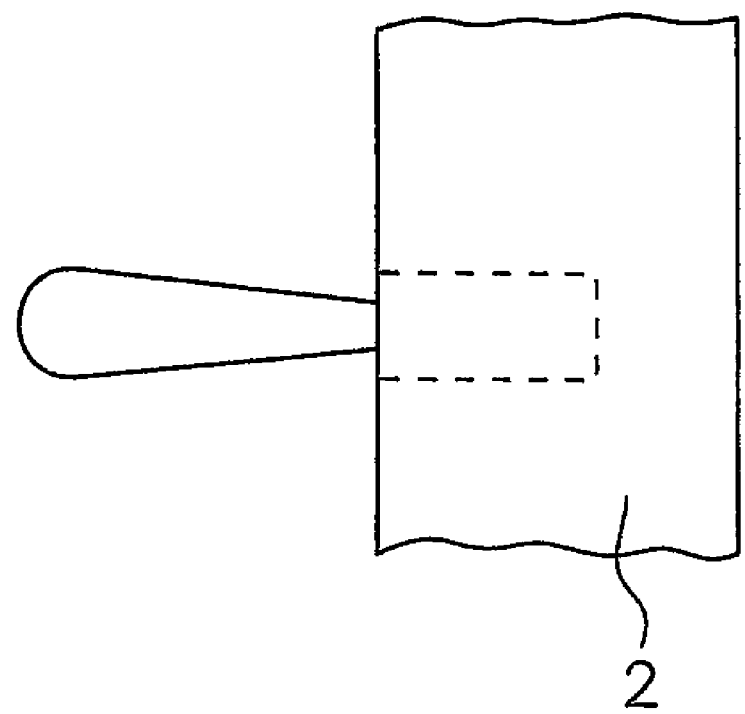
FIG. 8 illustrates a sipe blade of comparative example.

In order to demonstrate the arrangement and effect of the present invention, tires were subjected to vulcanizing processing using the above-described blades and the blades were checked for deforms thereon. As for the blades, the following were prepared. That is, examples having the configuration illustrated in FIGS. 1 to 3; and comparative examples having a configuration illustrated in FIG. 8, the thickness of which was the smallest at a portion connected with the rib. The dimensions of the examples are listed in the example 3 of the table 1. The dimensions of the comparative examples were T2=T3=0.5 mm. The comparative examples were identical to the examples excepting a point that round surface was not formed. In both of the examples and the comparative examples, the blade length was 11 mm, the material of the blade was SUS304, distance between the disposed blades was 5 mm, the material of the rib was AC7A, and the depth of the rib was 14 mm.

1,000 tires for each were subjected to the vulcanizing processing. In the examples, no deformation was found on the blades. On the other hand, in the comparative examples, deformations of 0.5 mm were found at the front-end portion of the blades with respect to a portion connected to the rib. In the comparative examples, although no deformation was found in a portion of the blades between the front-end portion and the portion connected to the rib, the blades were bent and deformed at the portion connected to the rib. As described above, the blades of the examples were prevented from being bent while performing the vulcanizing processing.

What is claimed is:

1. A sipe blade for forming a sipe with one end opened and the other end closed in a land portion on a tread surface of a tire, comprising:
    a front-end portion having a curved convex rounded, arc-like shape that forms the closed end of the sipe; and
    a connection-end portion that forms the open end of the sipe being connected to a rib that forms a groove portion, wherein the sipe blade has a thickness that varies from the front-end portion to the connection-end portion, the thickness of the front-end portion is larger than the smallest thickness in a portion between the front-end portion and the connection-end portion, and
    the thickness of the connection-end portion is not more than 3 mm and is the largest thickness in the portion between the front-end portion to the connection-end portion, inclusive, and the ratio of the largest thickness with respect to the smallest thickness is 1.2 to 3.0, and
    further wherein the thickness of the sipe blade gradually decreases from the widest part of the front-end portion toward the thinnest portion of the sipe blade having the smallest thickness and then smoothly increases toward the connection-end portion, forming a rounded surface having a curved concave arc-like shape at the connection-end portion, and wherein the sipe blade has a thickness that continuously varies from the curved convex shape to the curved concave shape.

2. A tire comprising a sipe with one end opened and the other end closed formed in a land portion of a tread surface thereof, the closed end having a curved concave rounded, arc-like shape,
    wherein the width of the sipe varies from the closed end to the open end, and the width at the closed end of the sipe is larger than the smallest width in a portion between the closed end and the open end, and
    the width at the open end of the sipe is not more than 3 mm and is the largest width in the portion between the closed end to the open end, inclusive, the ratio of the largest width with respect to the smallest width is 1.2 to 3.0, and
    further wherein the width of the sipe gradually decreases from the widest part of the closed end toward the narrowest portion of the sipe having the smallest width and then smoothly increases toward the open end, forming a rounded surface having a curved convex arc-like shape at the open end, and wherein the width of the sipe continuously varies from the curved concave shape to the curved convex shape.

* * * * *